US008012249B2

(12) United States Patent
Lehman et al.

(10) Patent No.: US 8,012,249 B2
(45) Date of Patent: Sep. 6, 2011

(54) RANGE HOOD WITH LIQUID FILTER

(75) Inventors: Daniel P Lehman, York, PA (US);
Daniel A Lehman, York, PA (US)

(73) Assignee: Air Dynamics Industrial Systems Corporation, York, PA (US)

( * ) Notice: Subject to any disclaimer, the term of this patent is extended or adjusted under 35 U.S.C. 154(b) by 479 days.

(21) Appl. No.: 12/182,108

(22) Filed: Jul. 29, 2008

(65) Prior Publication Data
US 2010/0024655 A1 Feb. 4, 2010

(51) Int. Cl.
*B01D 47/02* (2006.01)
(52) U.S. Cl. ...... 96/296; 96/326; 126/299 E; 55/DIG. 36
(58) Field of Classification Search ...... 96/326, 96/337, 329, 331
See application file for complete search history.

(56) References Cited

U.S. PATENT DOCUMENTS

| | | | |
|---|---|---|---|
| 2,868,108 A * | 1/1959 | Petersen | 126/299 D |
| 3,324,629 A | 6/1967 | Graswich | |
| 3,500,740 A * | 3/1970 | Aubrey | 126/299 D |
| 3,851,639 A * | 12/1974 | Beddoe | 126/25 R |
| 4,043,319 A | 8/1977 | Jensen | |
| 4,266,529 A | 5/1981 | Gaylord | |
| 4,281,635 A | 8/1981 | Gaylord | |
| 4,323,373 A | 4/1982 | Fritz | |
| 4,407,266 A | 10/1983 | Molitor | |
| 4,617,909 A | 10/1986 | Molitor | |
| 4,822,385 A | 4/1989 | Strege | |
| 4,856,493 A | 8/1989 | Fleming | |
| 4,944,782 A * | 7/1990 | Rajendran et al. | 55/444 |
| 5,069,197 A * | 12/1991 | Wisting | 126/299 E |
| 5,292,353 A | 3/1994 | Kaufman | |
| 5,641,338 A * | 6/1997 | Brookman | 95/213 |
| 5,718,219 A | 2/1998 | Boudreault | |
| 6,817,356 B2 | 11/2004 | Gallagher | |
| 6,821,318 B2 * | 11/2004 | Khosropour | 95/226 |
| 6,895,954 B2 * | 5/2005 | Swierczyna et al. | 126/299 E |
| 6,899,095 B2 * | 5/2005 | Livchak et al. | 126/299 D |
| 6,957,990 B2 * | 10/2005 | Lowe | 440/6 |
| 2006/0032492 A1 | 2/2006 | Bagwell et al. | |
| 2007/0089731 A1* | 4/2007 | Chang | 126/299 E |
| 2009/0235819 A1* | 9/2009 | Brookman | 95/185 |
| 2010/0089240 A1* | 4/2010 | Krichtafovitch | 96/32 |

OTHER PUBLICATIONS

Air Cleaning Equipment, Inc., "A.C.E. HATS Wet Scrubber Series: Hood Air Treatment System," product leaflet, May 2007.
Joseph, Gerald T., et al., "Scrubber Systems Operation Review, Self-Instructional Manual, Lessons 1-6," Raleigh, NC: North Carolina State University, College of Engineering, Industrial Extension Service, Jul. 1998.

* cited by examiner

*Primary Examiner* — Duane Smith
*Assistant Examiner* — Ives Wu
(74) *Attorney, Agent, or Firm* — PatentBest; Andrew McAleavey

(57) ABSTRACT

A range hood for a kitchen range or other similar appliance is disclosed. The range hood is adapted to be coupled to a blower to draw the contaminated effluent stream from the range into the hood. The effluent stream is drawn through a substantially horizontal perforated liquid support or impingement tray that is filled with a working liquid, and is then passed through a high-efficiency mist eliminator. The range hood offers a substantially straight airflow path from a point just inside the inlet to the outlet. The range hood also has a low profile, and offers direct access to its interior components for easy inspection and cleaning.

20 Claims, 13 Drawing Sheets

RANGE HOOD WITH LIQUID FILTER

BACKGROUND OF THE INVENTION

1. Field of the Invention

The invention relates to range hoods that filter contaminated air.

2. Description of Related Art

Cooking on a grill or range typically produces an effluent stream of hot, contaminated air. The contaminants typically include particles, like soot or smoke; vapors, like oil and water vapors and volatile, odorous chemical compounds; and water droplets. Dealing with that contaminated effluent from the range is a problem, particularly in restaurants and other commercial and industrial settings in which the range is used for many hours each day.

The traditional method for dealing with the effluent from the range in industrial settings is to install a range hood over the range and other cooking appliances, and to connect that range hood via ductwork to a fan or blower, which is typically located on the roof of the building or at some other suitable point. The blower creates a pressure drop across the hood, causing the range effluent to be drawn into the hood and away from the cooking appliances.

Most range hoods have some type of filtration mechanism, either immediately within the hood or in a separate scrubber downstream of and above the hood. U.S. Pat. Nos. 4,266,569 and 4,281,635 to Gaylord are examples of typical filtration arrangements for a range hood. The hood/ventilators disclosed by those patents draw air through a highly tortuous path defined by a number of baffles, the idea being that the effluent stream will impact or impinge on the baffles, leaving behind any entrained contaminants, while the purified air stream moves on. In practice, this does not work very efficiently, and creates its own problems.

In fact, the typical filters and scrubbers, such as those described above, can be as little as 10-15% efficient. With that low efficiency, contaminants build up in the hood, scrubber, and ductwork. That build-up can cause reduced airflow and is a major fire hazard. Unfortunately, cleaning ducts is not a trivial undertaking—ducts typically require continual maintenance and cleaning, which incurs a high cost.

Range hoods that are more efficient in filtering the effluent stream from the range, and do so closer to the range, help to prevent contamination in the ductwork downstream from the hood. However, efficiency in filtering the effluent stream is not the only challenge in hood design. A good range hood is most advantageously efficient in filtering and removing contaminants, but it is also preferably designed to minimize internal contaminant buildup and to be easily accessed for cleaning and replacement of parts. With respect to easy access, even if access ports or doors are provided in the hood, if a hood is too tall or "high profile," the components that most require cleaning may be too high above the workspace for easy access. In some cases, hood parts that most require cleaning or servicing may be above a drop ceiling and thus inaccessible without serious effort.

For example, U.S. Pat. No. 6,895,954 to Swierczyna et al. discloses a range hood in which the incoming contaminated effluent stream is forced to make a 180° turn into a water bath to strip some of the contaminants, after which it is forced to turn 180° again and is passed through a variety of filters, including a high-efficiency particulate air (HEPA) filter, before exiting the hood. Although the use of a water bath increases the efficiency of filtration, the tortuous air path makes it more likely that there will be a contaminant buildup within the hood itself, and the lack of easy access to the interior of the hood makes it difficult to deal with that contaminant buildup. Moreover, while a hood may attempt to direct the flow of effluent in a particular direction or through a particular series of turns, the effluent stream will take the path of least resistance, and it is thus possible that some of the stream will not travel through the water bath as intended. In the case of the Swierczyna hood, there is a gap between the water bath and the filter elements above it, making it possible that some of the effluent will bypass the filters.

SUMMARY OF THE INVENTION

One aspect of the invention relates to a range hood. The range hood has an inlet and an outlet. The inlet is adapted to accept a contaminated effluent stream and the outlet is adapted to be connected directly or indirectly to a blower such that in an operational condition of the range hood, a pressure drop is maintained across the range hood from inlet to outlet, thus drawing the effluent stream from the inlet toward the outlet. The inlet and outlet are arranged relative to one another such that a substantially straight airflow path is provided for the effluent stream from a point just inside the inlet to the outlet. A substantially horizontally-extending liquid support is provided in the airflow path. The liquid support is constructed and arranged to support liquid and has a plurality of perforations such that, in the operational condition, liquid is supported on and retained by the liquid support at least in part by the pressure drop across the range hood. The liquid support is provided in the airflow path such that, in the operational condition, the contaminated effluent stream flows through the liquid support and any liquid supported thereon as it flows along the airflow path. The range hood also includes a sump constructed and adapted to hold liquid, the sump being arranged relative to the liquid support such that liquid from the liquid support can drain into the sump.

Another aspect of the invention also relates to a range hood. The range hood has an inlet and an outlet. The inlet is adapted to accept a contaminated effluent stream and the outlet is adapted to be connected directly or indirectly to a blower such that in an operational condition of the range hood, a pressure drop is maintained across the range hood from inlet to outlet, thus drawing the effluent stream from the inlet toward the outlet. The inlet and outlet are arranged relative to one another such that a substantially straight airflow path is provided for the effluent stream from a point just inside the inlet to the outlet. A substantially horizontally-extending liquid support is provided in the airflow path. The liquid support is constructed and arranged to support liquid and has a plurality of perforations such that, in the operational condition, liquid is supported on and retained by the liquid support at least in part by the pressure drop across the range hood. The liquid support is provided in the airflow path such that, in the operational condition, the contaminated effluent stream flows through the liquid support and any liquid supported thereon as it flows along the airflow path. The range hood also includes a mist eliminator arranged in the airflow path between the liquid support and the outlet, and sump constructed and adapted to hold liquid, the sump being arranged relative to the liquid support such that liquid from the liquid support can drain into the sump. The sump includes a main sump compartment, a sump drain compartment constructed and adapted to be connected to a drain, and a partition separating the main sump compartment and the sump drain compartment. The arrangement of the main sump compartment and the sump drain compartment is such that contaminants can be removed from the sump by selectively overflowing the sump into the sump drain compartment.

Yet another aspect of the invention relates to a ship. The ship comprises a ship hull, one or more effluent-generating appliances installed within the ship hull; and a range hood installed within the hull in operational association with the one or more cooking appliances. The range hood has an inlet and an outlet. The inlet is adapted to accept a contaminated effluent stream and the outlet is adapted to be connected directly or indirectly to a blower such that in an operational condition of the range hood, a pressure drop is maintained across the range hood from inlet to outlet, thus drawing the effluent stream from the inlet toward the outlet. The inlet and outlet are arranged relative to one another such that a substantially straight airflow path is provided for the effluent stream from a point just inside the inlet to the outlet. A substantially horizontally-extending liquid support is provided in the airflow path. The liquid support is constructed and arranged to support liquid and has a plurality of perforations such that, in the operational condition, liquid is supported on and retained by the liquid support at least in part by the pressure drop across the range hood. The liquid support is provided in the airflow path such that, in the operational condition, the contaminated effluent stream flows through the liquid support and any liquid supported thereon as it flows along the airflow path. The liquid support also includes a number of baffles attached to the liquid support and extending upwardly therefrom. The baffles are arranged so as to divide and enclose a plurality of individual liquid areas along the liquid support, and the height and arrangement of the baffles is such that liquid will be retained in the individual areas of the liquid support despite movement of the ship. The range hood also includes a sump constructed and adapted to hold liquid, the sump being arranged relative to the liquid support such that liquid from the liquid support can drain into the sump.

Other aspects, features, and advantages of the invention will be described in the following.

BRIEF DESCRIPTION OF THE DRAWINGS

The invention will be described with respect to the following drawing figures, in which like numerals represent like features throughout the drawing figures, and in which.

DETAILED DESCRIPTION

Figure 1:
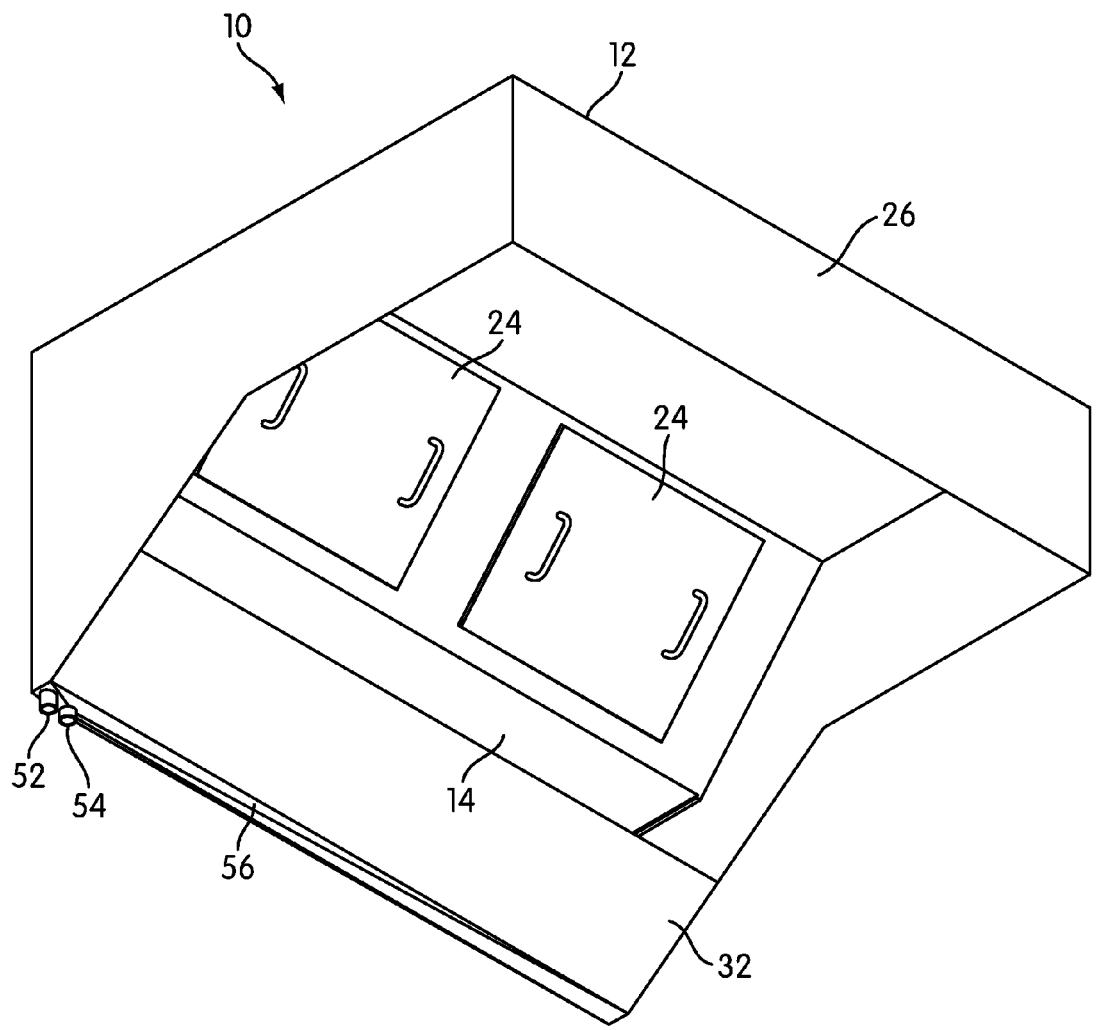
FIG. 1 is a perspective view of a range hood according to one embodiment of the invention.

FIG. 1 is a perspective view of a range hood according to one embodiment of the invention, generally indicated at 10. The range hood 10 is particularly adapted to filter a contaminated effluent stream, and would generally be installed over a cooking range or another appliance that generates an effluent stream (not shown in FIG. 1). Although range hoods according to embodiments of the invention may be used to filter and purify a variety of effluent streams, they may be particularly advantageous in use with effluent streams containing oils and vapors. In the following description of range hoods according to embodiments of the invention, it should be understood that if directional or orientational terms such as "left," "right," "upper," and "lower" are used, they are used with respect to the coordinate system of the drawing figures, unless otherwise indicated.

The range hood 10 includes a hood body 12, the outer "shell" of the range hood 10 that contains all of its components. The hood body 12 defines an inlet or inlet area 14, where contaminated effluent flows into the range hood 10, and an outlet 16, where purified air leaves the range hood 10. The outlet 16 is illustrated schematically in FIG. 2, a front elevational view of the range hood 10, and may have any size, shape, or other features desirable for connecting it with ductwork 18. The ductwork 18 is, in turn, connected to and in fluid communication with a fan or blower 20. In many installations, the blower 20 would be located on the roof of the building or structure in which the range hood 10 is installed, and would, when in operation, create a pressure drop across the hood 10 from inlet to outlet, thus drawing the effluent stream into the inlet 14 and from the inlet 14 toward the outlet 16. In some embodiments, the blower 20 may be connected to more than one range hood 10. The particular blower that is used would be determined by the number and size of range hoods in use, the nature and configuration of the ductwork, the desired air flow volume and pressure drop across the range hood or hoods, and other conventional considerations.

In some embodiments, filters 22 may optionally be placed between the outlet 16 of the range hood 10 and the blower 20, after the outlet of the blower 20, or at any other convenient point. Such filters 22 may, for example, catch fine smoke particles or other fine particulate matter. The use of filters 22 will be described below in more detail.

In addition to defining the inlet 14 and outlet 16, the hood body 12 includes access doors or panels 24 that allow direct access to the internal components of the hood 10, and provides a flange 26, which extends downwardly in the illustrated embodiment to isolate the range hood 10 and its inlet 14 somewhat from other airflows within the workspace, thus concentrating the effects of the hood 10 on the area directly under it. Of course, the flange 26 may have essentially any shape or contours, and need not merely extend downward.

Overall, the range hood 10 is generally sized to fit conventional commercial or industrial kitchen ranges and other kitchen appliances. To that end, the depth and width of the hood 10 would generally match the depth and width of the range or other effluent-producing appliance or appliances whose effluent streams the hood 10 is intended to handle. One embodiment of the range hood 10 may be approximately 6 feet (2 meters) long and approximately 5 feet deep; other embodiments may be, for example, double that length and may differ in depth as well. As those of skill in the art will realize, a range hood 10 according to embodiments of the invention may be made to essentially any set of dimensions without altering its basic components or mode of operation, and in some cases, its footprint or outer dimensions may be defined by applicable safety, fire, or other regulations. Of course, changes in the dimensions of the hood 10 may necessitate changes in the specifications of the blower 22 or blowers that are used with the hood 10.

Figure 2:
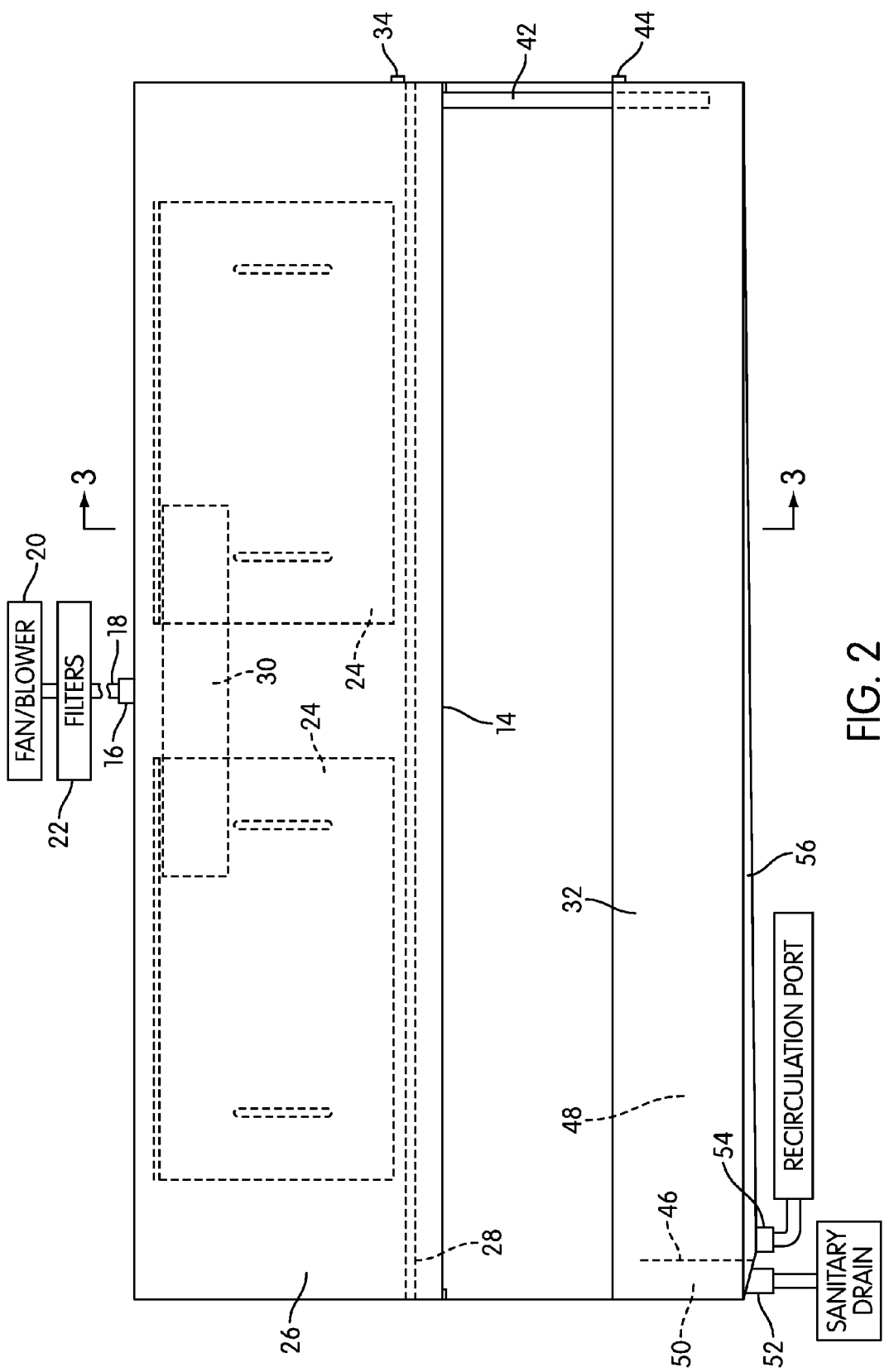
FIG. 2 is a front elevational view of the range hood of FIG. 1.
Figure 3:
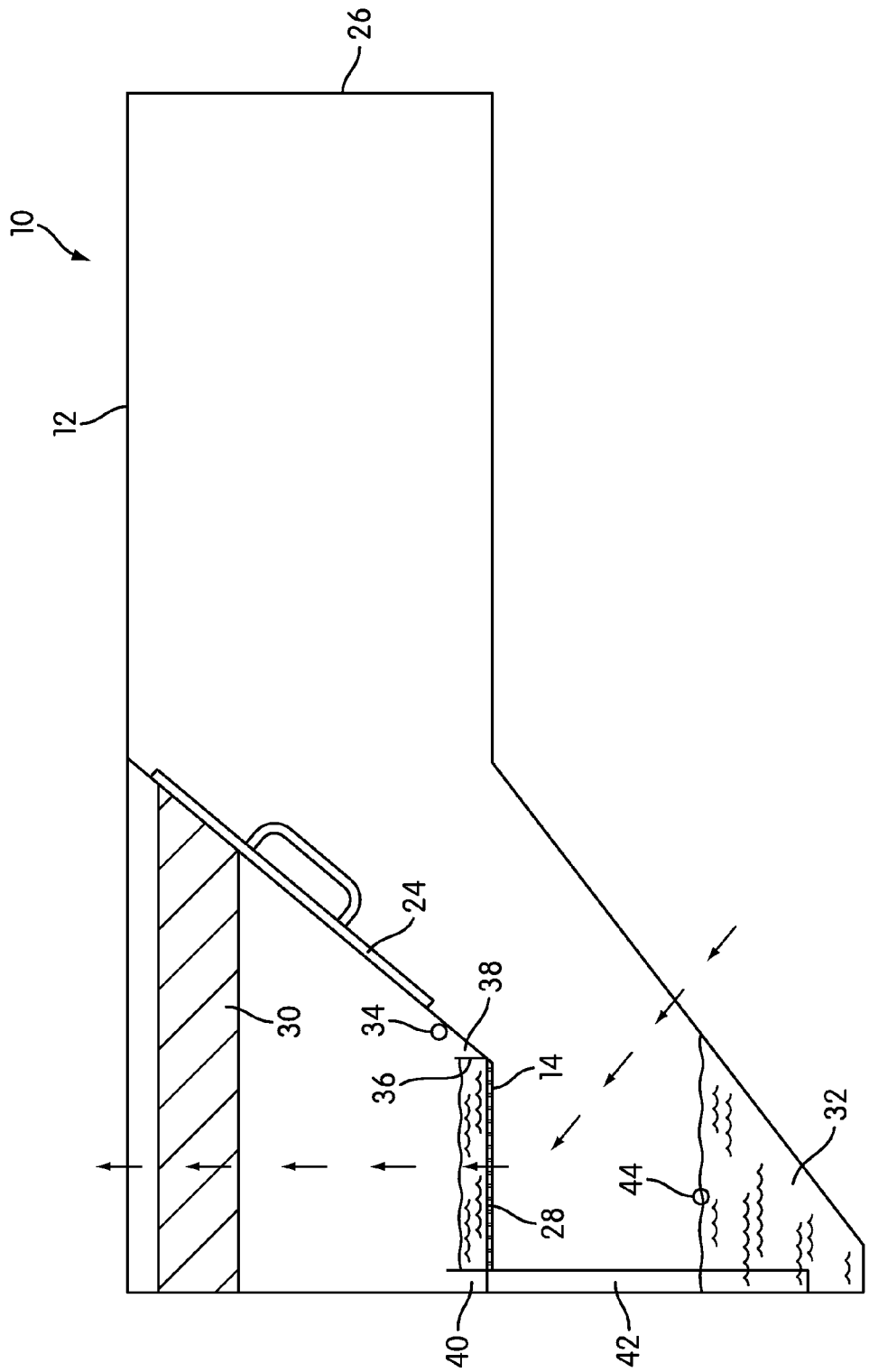
FIG. 3 is a sectional view of the range hood taken through Line 3-3 of FIG. 2.
Figure 12:
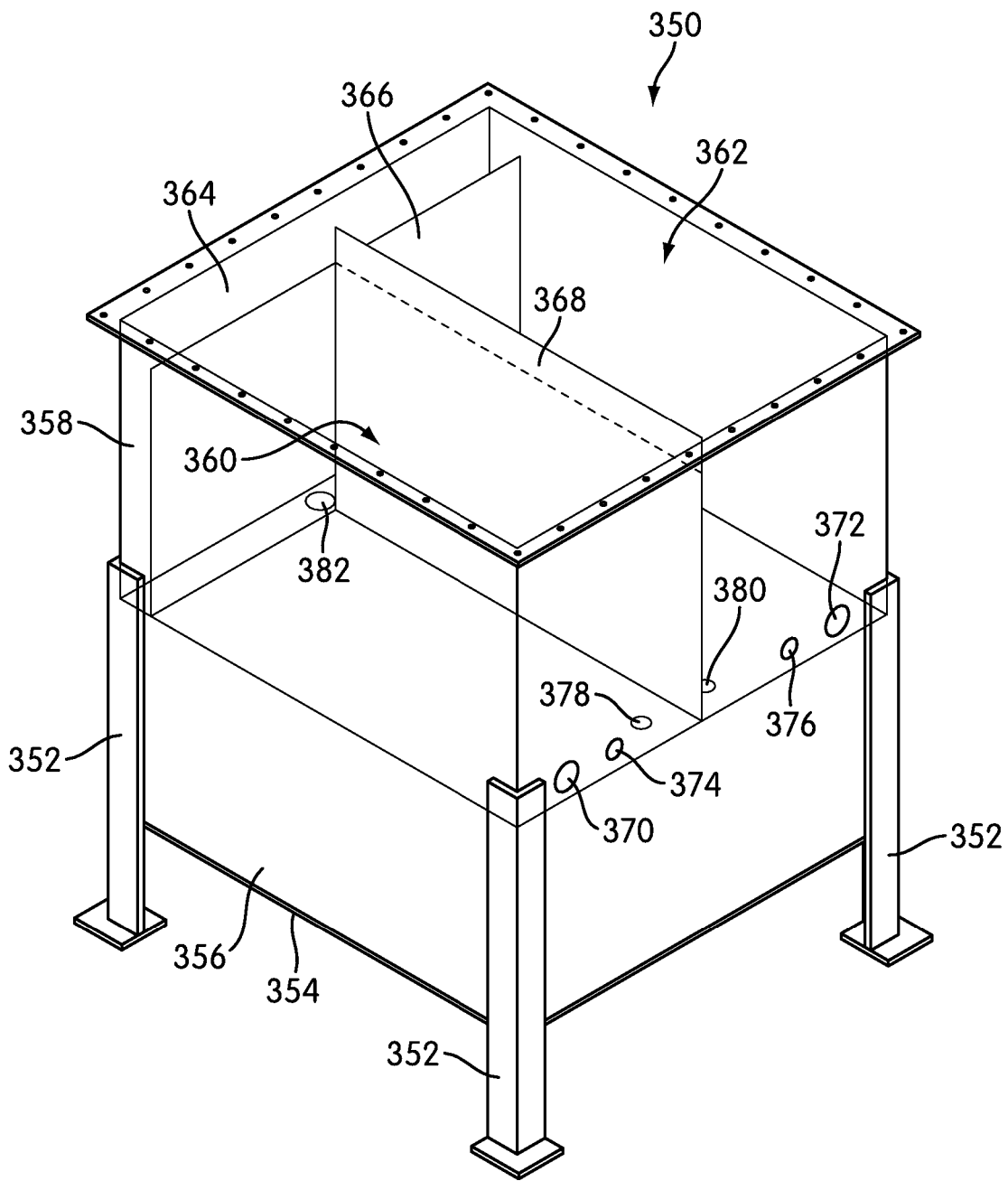
FIG. 12 is a perspective view of a recirculation tank that may be used with range hoods according to embodiments of the invention.

The internal components of the range hood 10 are illustrated in phantom in FIG. 2, in FIG. 3, a sectional view of the range hood taken through Line 3-3 of FIG. 2, and in the exploded perspective view of FIG. 12. As shown, proximate to the inlet 14 is a substantially horizontal liquid support or impingement tray 28 that is designed to support and contain a quantity of liquid when the range hood 10 is operational. The impingement tray 28 extends substantially the entirety of the range hood 10 and attaches at each end. The bottom of the impingement tray 28 is perforated, such that when the range hood 10 is operational, liquid is maintained in the impingement tray 28 at least in part by the pressure drop created by the blower 20. It should be understood that although one impingement tray 28 is shown and described in the figures, range hoods 10 according to embodiments of the invention may use any number of impingement trays 28, for example, one above the other in series, for an additive effect.

The number, type, shape, and other characteristics of the perforations 29 in the impingement tray 28, may vary from embodiment to embodiment and may be selected based on a number of factors, including the total airflow rate through the hood 10, the pressure drop across the hood 10 as a whole, the intended pressure drop across the impingement tray 28 itself, and the pressure drop across all of the impingement trays 28 if more than one impingement tray 28 is used. As those of skill in the art will realize, selecting the characteristics of the impingement tray 28 and its perforations 29 is a process of balancing several factors. More particularly, the more open area the impingement tray 28 has, the easier it is for effluent to flow through the tray 28. However, if the tray 28 is too open, it becomes very difficult to support and retain the liquid in it. Impingement trays 28 with more open area typically require more airflow through the hood and/or a greater pressure drop to retain the liquid in the impingement tray 28. If multiple impingement trays 28 are used in the same hood, then the airflow and pressure drop across all of the trays would generally be considered when designing the range hood 10.

Generally speaking, the porosity of the impingement tray 28 may be a porosity that corresponds to a pressure drop across the impingement tray 28 in the range of about 0.13 inches of water to about 0.5 inches of water at flow rates in the range of about 300 cubic feet per minute (CFM) of air to about 600 CFM of air per linear foot of hood length. Specified alternatively, the impingement tray 28 may have a total open area in the range of about 10% to about 30% with air flow rates in the range of about 300 CFM of air to about 600 CFM of air per linear foot of hood length. As one example, an impingement tray 28 total open area of about 23% may be suitable in some embodiments.

The amount of liquid that the impingement tray 28 is designed to support and contain may vary from embodiment to embodiment, and may also vary with the operational settings of the hood 10 itself. Generally speaking, the height of the liquid in the impingement tray 28 relates to the pressure drop across the hood 10. For example, if the pressure drop across the hood is one inch of water, the height of liquid in the impingement tray 28 will relate to the water depth and the air volume flowing through the hood 10. Pressure drops across the hood 10 in the range of about one inch of water to about three inches of water may be used in most embodiments of the invention, meaning that the height of liquid in the impingement tray 28 will typically fall in the range of about one inch to about three inches. The actual physical depth of the impingement tray 28 may vary, may be separately determined, and may or may not be equal to the expected liquid height. For example, in particular embodiments, the impingement tray 28 may have a physical depth of about two inches and may be designed to hold approximately one inch of liquid under standard operational conditions.

Also provided within the hood body 12 and above (i.e., downstream from) the impingement tray 28 is a high-efficiency mist eliminator 30, whose purpose is to strip water vapor and liquid droplets from the effluent stream. The mist eliminator 30 may, for example, strip small water and oil droplets down to about the 15 micron range. The mist eliminator 30 is generally horizontally-extending, although it may be given a slight tilt, for example, of approximately 1-5 degrees in any direction, so as to encourage droplets caught by the mist eliminator 30 to drain from it. Although a mist eliminator 30 may be present in many or most embodiments, it should be considered an optional component. In some embodiments, a mist eliminator may be present beyond the outlet 16 of the hood 10, or no mist eliminator may be present at all. In fact, if the outlet 16 is wide enough and the outflow from the hood 10 consequently has a low enough velocity, larger droplets of water may simply drop out of the stream because of the effects of gravity. Additionally, although a number of commercial mist eliminators are known, a number of components may be used as a mist eliminator in embodiments of the present invention. For example, a conventional filter could be used in some embodiments as a mist eliminator, to be removed and replaced when it becomes sodden.

As shown by the arrows in FIG. 3, air is drawn into the inlet 14 of the range hood 10 by the pressure drop created by the blower 20 and passes through the impingement tray 28 and the liquid contained therein from below because of the perforations 29 in the bottom of the impingement tray 28. Passing through the liquid in the impingement tray 28 strips the effluent stream of oils and some other contaminants, and the effluent stream then passes through the high-efficiency mist eliminator 30 to strip any water vapor that might be in the stream due to the passage through the liquid-filled impingement tray or any small oil droplets that may still be present in the stream. From the mist eliminator 30, the effluent stream passes to the outlet 16 and is exhausted from the hood 10 into the ductwork 16.

In addition to the impingement tray 28 and mist eliminator 30 in the upper portion of the hood 10, the hood 10 includes a sump 32. The sump 32 holds liquid, acts as the main liquid reservoir for the hood 10, and is arranged relative to the impingement tray 28 such that liquid from the impingement tray 28 can drain into the sump 32. If the mist eliminator 30 is tilted as described above, the sump 32 may also directly or indirectly receive droplets of liquid caught by the mist eliminator 30. Additional features and characteristics of the sump will be described below in more detail.

As shown in FIG. 3, the components 28, 30 of the hood 10 and the inlet 14 and outlet 16 are arranged relative to one another so as to provide a substantially straight airflow path from a point just inside the inlet 14 to the outlet 16. The effluent stream may make a gentle change in direction as it is drawn into the range hood 10, but once the effluent stream is within the range hood 10, it follows the relatively straight airflow path indicated by the arrows in FIG. 3.

Of course, as those of skill in the art will realize, the term "relatively straight airflow path" does not necessarily imply that the airflow path is entirely linear or that the flow is necessarily laminar. There may be some eddies, swirls, or changes in the direction of the flow within the hood 10. However, as shown in FIG. 3, in the illustrated embodiment, the airflow path within the hood 10 is not tortuous by design; the effluent stream is not forced to change direction for purposes of filtration or purification. Within the hood 10, there are no baffles or other flow-directing structures that are designed to divert or change the direction of the effluent stream. However, certain flow-directing structures may be advantageously added to the inlet 14, and will be described below in more detail, and certain structures may be added at, near, or beyond the outlet to direct the flow appropriately into the outlet 16.

The substantially straight airflow path and lack of baffles or other flow-directing structures within the hood 10 confer certain advantages on the hood 10. Most notably, because the airflow path is substantially straight and without flow-directing structures, there is less likelihood that oils or other contaminants will be trapped and will build up within the hood 10, making it easier to clean and maintain. The position, size and arrangement of the access panels 24 relative to the interior components also make the hood 10 easier to inspect and clean. By opening one of the access panels 24, a worker can view, inspect, and clean both the impingement tray 28 and the mist eliminator 30. The overall dimensions and proportions of the hood 10 are most advantageously selected such that the access panels 24 are below any drop ceiling that may be present in the workspace and can thus be accessed by a worker standing on, at most, a short stool. For example, the distance from the floor to the bottom of the hood 10 in a typical installation may be on the order of 6.5 feet (just over 2 meters).

It is also advantageous if the internal components, such as the mist eliminator 30 and impingement tray 28, are mounted within the hood 10 such that they can be removed for cleaning and replaced. For example, a soiled mist eliminator 30 might be removed from the hood 10 and placed in a conventional industrial dishwasher.

In addition to the features that allow a worker to clean the hood 10 easily, the hood 10 itself includes a number of features designed to allow it clean itself and to dispose of the filtrate or swarf produced when oil and other contaminants are separated from the effluent stream. Many of those self-cleaning and swarf-separating features arise, at least in part, because of the manner in which liquid is circulated through the range hood 10.

Although this description refers to a generic "liquid" as the working fluid of the range hood 10, in most embodiments, the primary working liquid will be water, most often supplied from a conventional source, such as municipal water. However, surfactants and other additives may be added to the water to emulsify oils and fats and to cleanse the interior of the hood 10.

Figure 4:
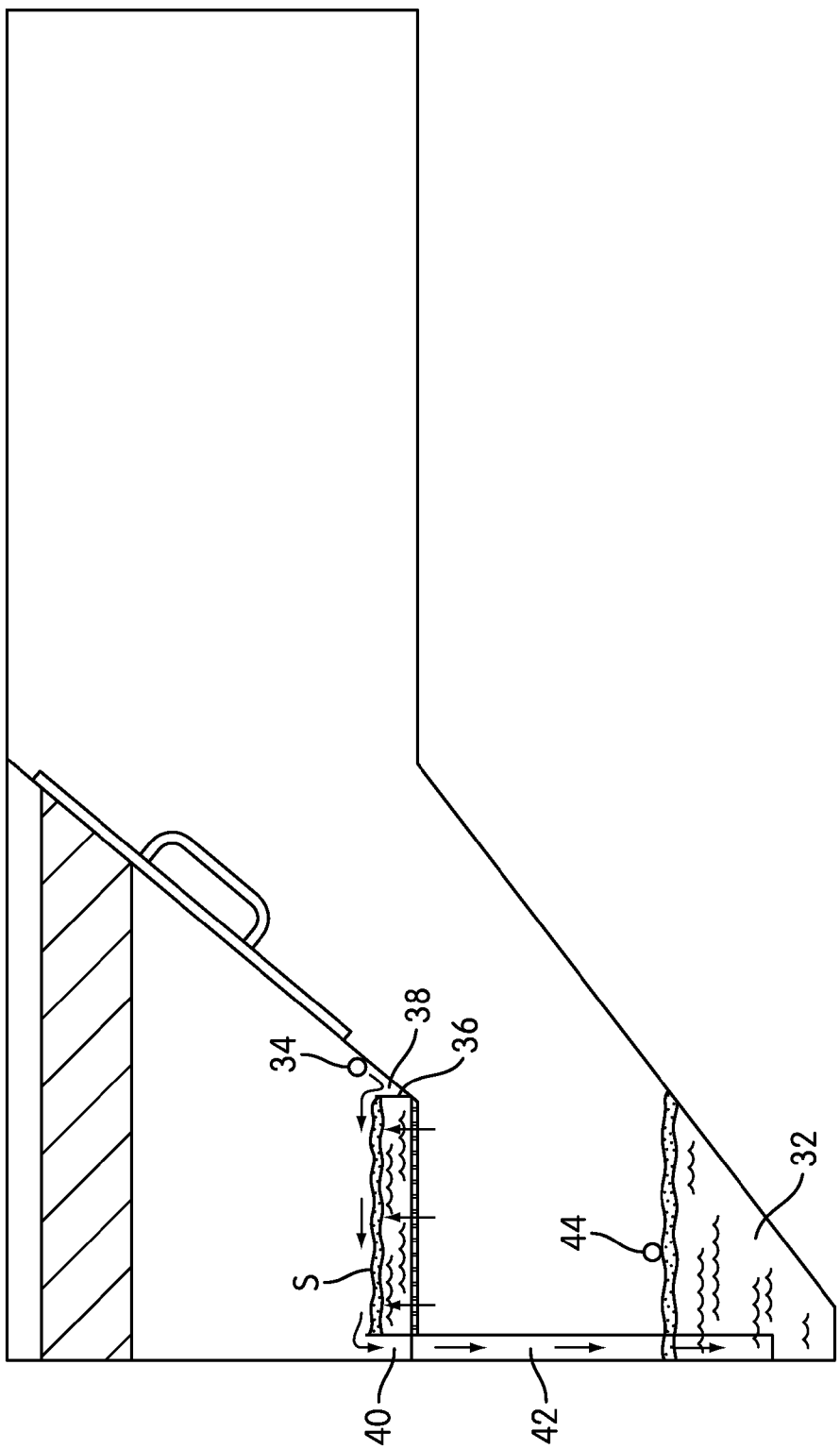
FIG. 4 is a sectional view of the range hood similar to the view of FIG. 3, illustrating the flows of air and liquid within the range hood.

Contaminants are first separated from the effluent stream at the impingement tray 28. The major contaminant will often be oil, which, because it is generally immiscible with and less dense than water, will typically form a scum layer on top of the water in impingement tray 28. FIG. 4 is a sectional view of the range hood 10 similar to the view of FIG. 3, illustrating water in the impingement tray 28 with a scum or swarf layer, indicated as S, floating on top.

The impingement tray 28 is filled and supplied with liquid by a tray supply inlet or pipe 34. In the illustrated embodiment, the supply pipe 34 is at one end of the range hood 10, although as a practical matter, the impingement tray 28 may be filled from any side. However, as shown by the arrows in FIG. 4, liquid from the supply pipe 34 does not flow directly into the impingement tray 28. Instead, the right edge 36 of the tray 28 extends upwardly to form a partition that acts as a weir, thus defining a small reservoir space 38. Liquid from the inlet pipe 34 flows into the reservoir space 38. Only when the reservoir space 38 is full and the height of the liquid in it is greater than the height of the edge 36 of the impingement tray 28 does the liquid spill over into the impingement tray 28. The impingement tray 28 is filled in this fashion when the hood 10 is initially activated, as will be described below in more detail.

This mechanism can also be used to skim the layer of scum or swarf S from the impingement tray 28. Specifically, as shown in FIG. 4, when a layer of scum or swarf has accumulated, the inlet pipe 34 can be opened to allow liquid in. That liquid is then allowed to overflow the right edge 36 of the impingement tray 28 and cascade onto the impingement tray 28, creating a wavelike skimming activity across the top of the impingement tray 28 that deposits the scum or swarf S into a drain space 40 on the other side of the impingement tray 28. The water level in the reservoir space 38 may be kept as close as practicable to the top of the right edge 36 of the impingement tray 28, such that relatively little liquid need be added to the reservoir space 38 in order to create the skimming effect.

The drain space 40 is connected to and in fluid communication with a drain conduit 42 that terminates in and drains into the sump 32. The floor of the drain space 40 may be inclined or otherwise contoured so as to bias material within the drain space 40 to move into the drain conduit 42. It should be understood that the position of the drain conduit 42 and its characteristics are not critical, and that liquid or swarf from the drain space 40 may be conveyed to the sump 32 in any conventional manner.

The sump 32 itself may also include a similar skimming mechanism in at least some embodiments. More particularly, a sump liquid inlet 44 is provided, and can be used both to fill the sump 32 when the hood 10 is activated and to provide make-up liquid as liquid is consumed or circulated out of the sump 32 during operation. In the illustrated embodiment, as shown in FIGS. 2 and 12, the sump 32 also includes a partition 46 that defines and divides the sump 32 into two compartments, a main sump compartment 48 and a sump drain space 50. In FIGS. 2 and 12, these compartments are arranged such that the sump drain space 50 is positioned at one end of the hood 10 opposite the end where the sump liquid inlet 44 is located, although these components may be arranged in any manner and, as with the impingement tray 28, the sump may be filled and drained from any side. When it is necessary or desirable to skim the sump 32, its liquid inlet 44 can be opened and water added to the sump 32 until the sump overflows the partition 46, sending the scum layer into the sump drain space 50. The general process of skimming the impingement tray 28 and the sump 32 may be referred to as a blowdown cycle.

As with the impingement tray 28 and its reservoir space 38, the liquid level in the main sump compartment 48 may be kept as close as practicable to the top of the partition 46, e.g., within about ⅛ of an inch to about ½ of an inch of the top of the partition 46, such that relatively little liquid need be added to skim the sump 32. Ultimately, if the liquid in the sump 32 is maintained at a height close to the height of the partition 46, a blowdown cycle may consume as little as a fraction of a gallon of fresh liquid for a range hood 10 six feet (approximately 2 meters) long. Additional structures and techniques for reducing the amount of liquid consumed in a blowdown cycle will be described below.

As shown particularly in FIGS. 1 and 2, the sump 32 includes two ports in its lower portion. The first port, a sanitary drain port 52, is in fluid communication with the sump drain space 50 and with a sanitary sewer or other suitable disposal system, such that material in the sump drain space 50 can be drained away and removed from the hood 10. The sump 32 also includes a recirculation port 54 in fluid communication with the main sump compartment 48 from which working liquid can be drained from the sump for recirculation or disposal. The sump bottom 56 may be gently sloped or otherwise contoured to bias liquid to move toward the two ports 52, 54. For example, the sump bottom 56 may have a slope of about ⅛ of an inch per foot.

The recirculation port 54 may be used to drain the sump 32 when the range hood 10 is being taken out of service for some time, for example, at the end of a shift. However, as was noted above, the recirculation port 54 may also be used to recirculate liquid through the hood 10. For example, liquid removed from the recirculation port 54 may be filtered and pumped back into the hood through the inlet pipe 34 that supplies the impingement tray 34. An appropriate system of pumps and valves may be coupled to the recirculation port 54 to allow a user or an automated system to select whether liquid is being drained or recirculated at any one time. Surfactant or other additives may be added to the recirculating liquid at any point. Additional structures and techniques for treating and filtering liquid removed through the recirculation port 54 will be described in greater detail below.

Although two ports 52, 54 are shown in the illustrated embodiment, range hood embodiments are possible in which there is only one external outlet port in the sump, particularly if appropriate valves are used to selectively drain either the sump drain space 50 or the main sump compartment 48.

Certain variations and modifications may be made to the range hood 10, and some of those will be described below. In the description below, unless a component is specifically described as being different in form or function than the corresponding component in the range hood 10, it may be assumed that the components are substantially similar.

Figure 5:
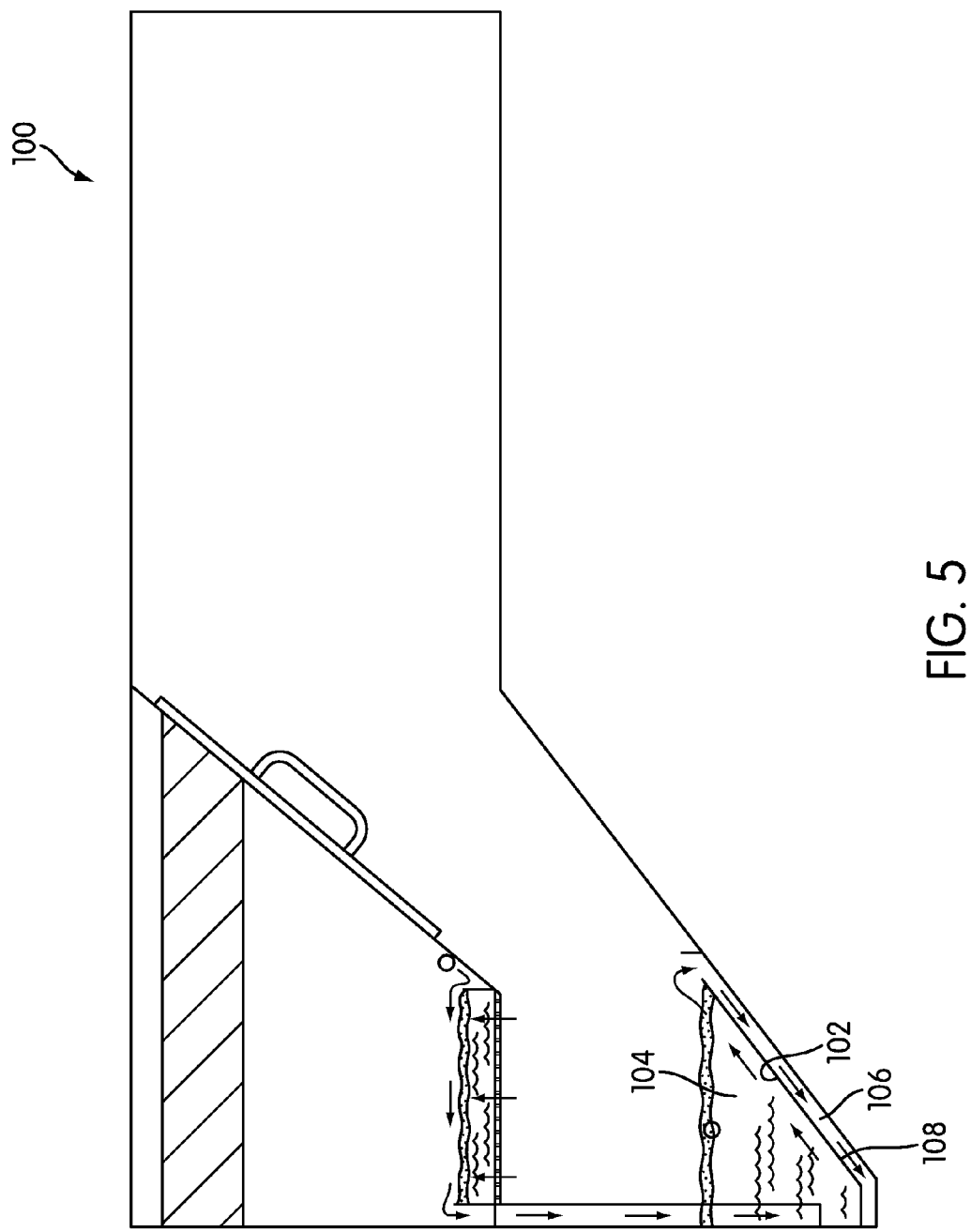
FIG. 5 is a sectional view of a range hood according to another embodiment of the invention, illustrating another arrangement of the sump.

First, as was described above, the sump may be partitioned or arranged in a variety of ways. FIG. 5 is a sectional view similar to the view of FIG. 4, illustrating another embodiment of a range hood, generally indicated at 100, that has a slightly different sump arrangement. In particular, the sump 102 is divided into a main sump compartment 104 and a sump drain compartment 106. However, instead of being located at one end of the sump 102, the sump drain compartment 106 is defined by a partition 108 that extends along the front of the sump 102, angling downward and extending partially under the main sump compartment 104. Liquid flow in the range hood 100 is illustrated by the arrows in FIG. 5.

Figure 6:
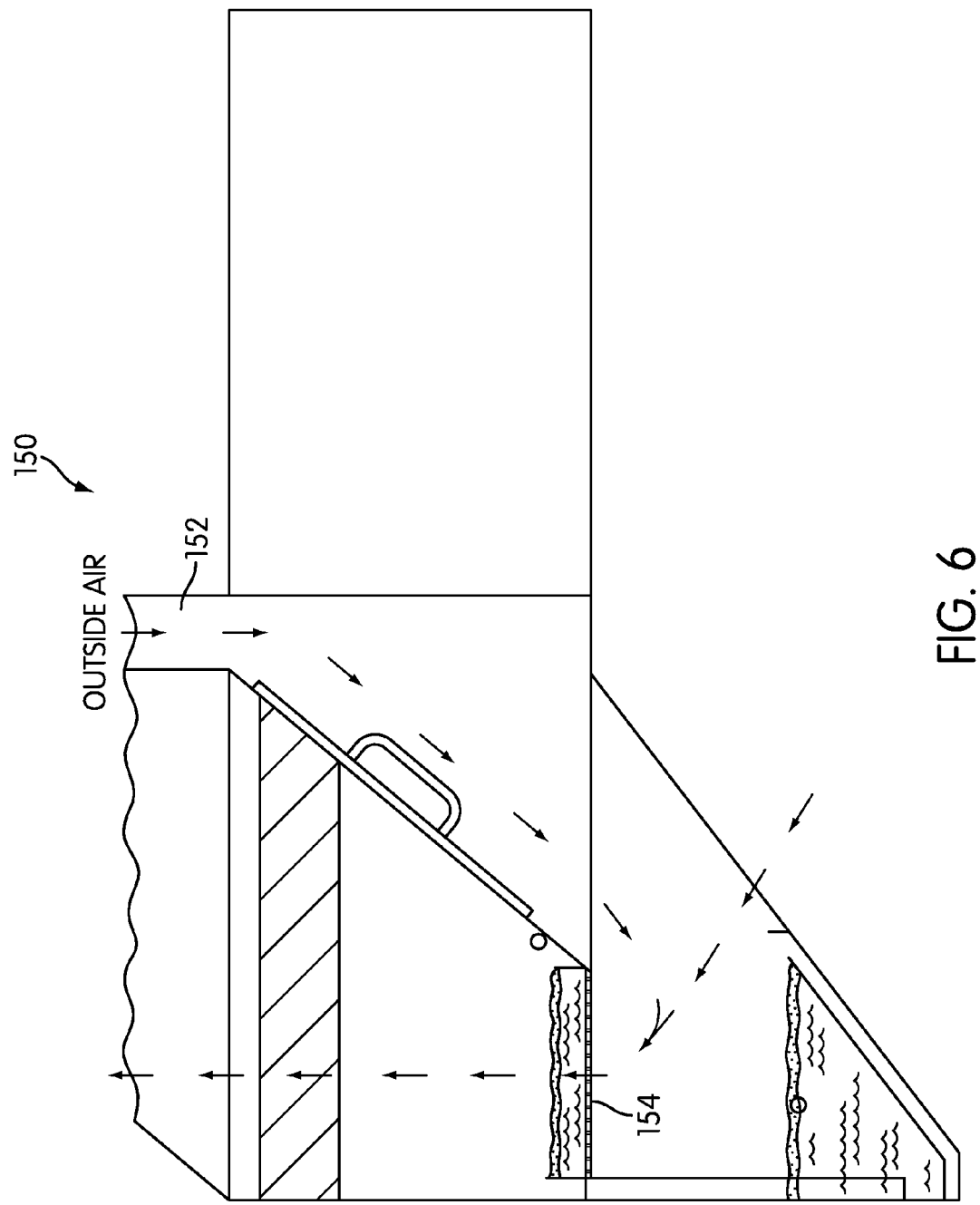
FIG. 6 is a sectional view of a range hood according to yet another embodiment of the invention, illustrating the use of an outside air supply to pre-cool the incoming effluent.

A number of other modifications may also be made to the embodiment of the range hood 10 illustrated in FIGS. 1-4. FIG. 6 is a cross-sectional view of a range hood 150 according to another embodiment of the invention. In the range hood 150 of FIG. 6, and outside air pipe or conduit 152 is provided. On one end, the outside air conduit is in fluid communication with the outside, such that outside air will enter the pipe and be conducted to the hood 150, where it will mix with the incoming effluent stream at or near the inlet 154, as indicated by the arrows in FIG. 6. If necessary, the outside air may be pumped down to the hood 150. The advantage of the configuration illustrated in FIG. 6 is that the incoming outside air may pre-cool the effluent stream, making it more likely that contaminant particles, such as oil and water droplets, will condense and drop out of the stream. The introduction of outside air may be particularly helpful if the incoming effluent stream is very hot, for example, as may be the case with high-temperature wok cooking, or broiling over an open flame.

Figure 7:
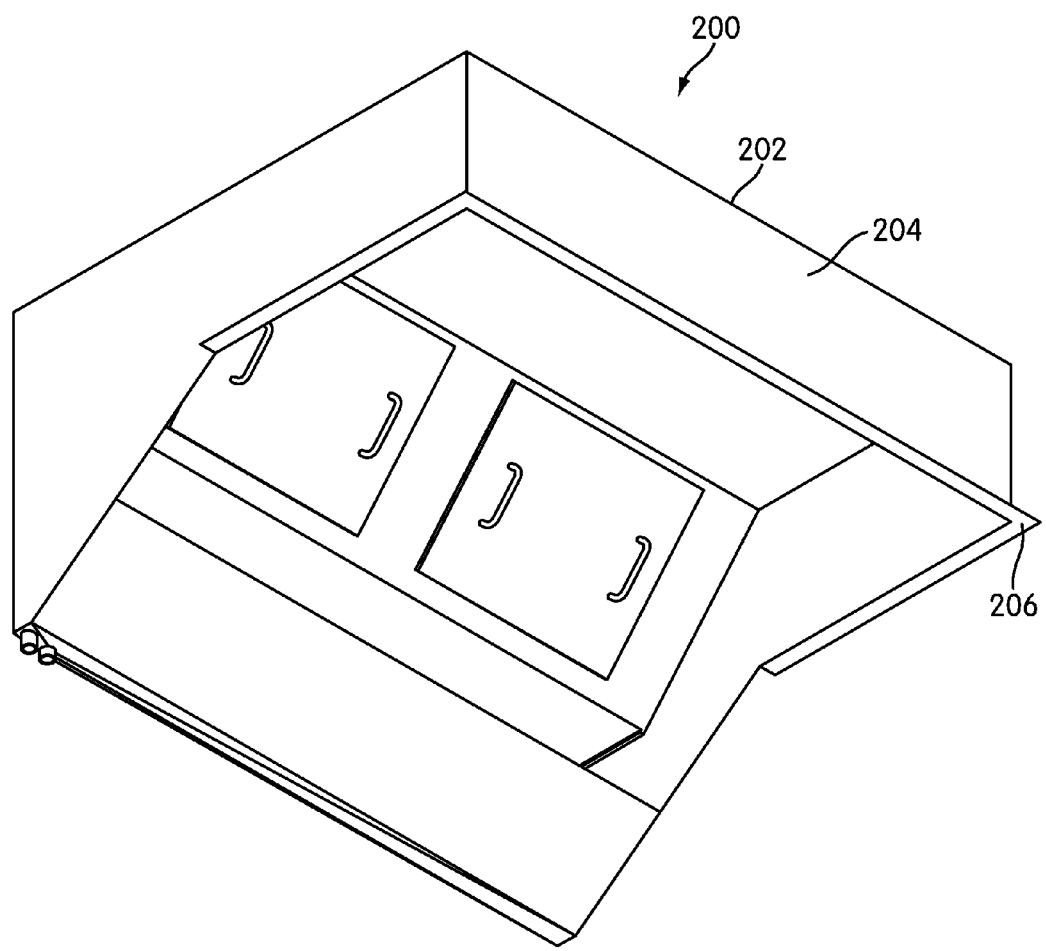
FIG. 7 is a perspective view of a range hood according to a further embodiment of the invention.

Additional features may be added to further isolate the range hood from other airflows in the workplace and to reduce dead space within the hood. FIG. 7 is a perspective view of another embodiment of a range hood, generally indicated at 200. In range hood 200, the hood body 202 includes a downwardly-extending flange 204 similar to that of other embodiments. However, the downwardly-extending flange 204 terminates at and is attached to a horizontally-extending flange 206 whose purpose is to further isolate the range hood 200 from other airflows within the workspace. The horizontally-extending flange 206 wraps around three sides of the hood 200. The two flanges 204, 206 may be formed of a single piece of material, or may be formed of separate pieces of material and joined together by using an appropriate and conventional method (e.g., brazing, welding, fasteners, etc.).

Figure 8:
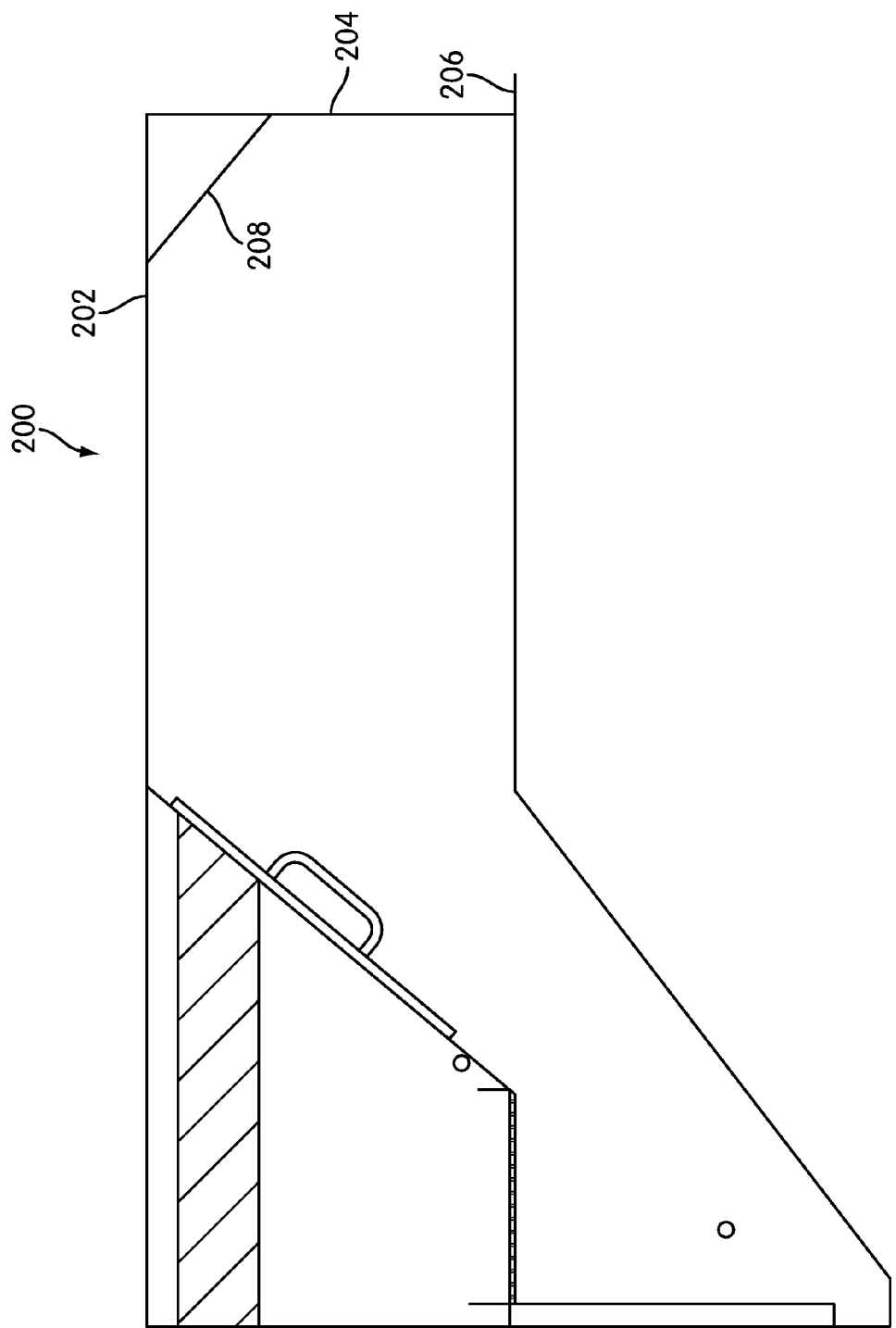
FIG. 8 is a sectional view of the range hood of FIG. 7, illustrating the use of a plate to block dead airspace within the hood.

FIG. 8 is a cross-sectional view of the range hood 200 of FIG. 7. The cross-sectional view of FIG. 8 illustrates an additional feature of the range hood 200: a plate 208 used to block the forward upper corner of the hood body 202, where the flange 204 makes a 90-degree angle. The use of blocking plates, such as the plate 208, can prevent incoming effluent from entering "dead spaces" where it is less likely to be drawn through the hood 200. Those spaces, in turn, can be used to hold electronic control components, lighting components, or other such anciliary components.

Figure 9:
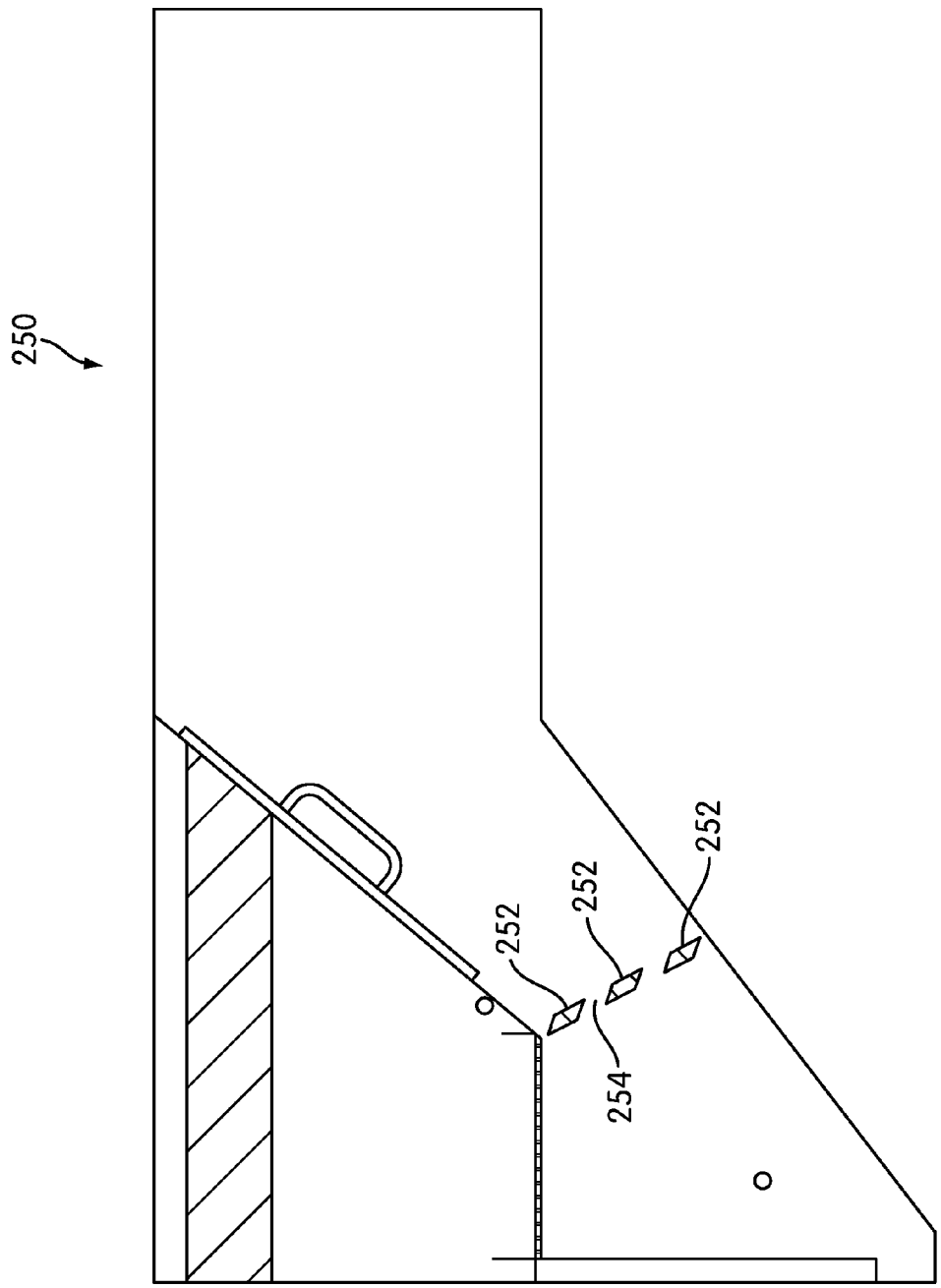
FIG. 9 is a sectional view of a range hood according to another further embodiment of the invention, illustrating the use of louvers in the air inlet area to distribute the incoming effluent from the range.

As was noted above, other flow-diverting modifications may be made near the inlet of a range hood according to embodiments of the invention. In particular, one potential issue with range hoods of this type is that the effluent stream may be drawn toward the center of the range hood, such that more effluent may flow through the hood near its center as compared with the left and right ends, placing an extra burden on the center of the hood. FIG. 9 is a cross-sectional view of a range hood 250 that includes structures intended to ameliorate this issue: flow-distributing louvers 252 are placed across the inlet area 254 to distribute the incoming effluent stream across the entire inlet area 254.

Other variations may be made depending on the environment in which the range hood is installed. For example, the efficacy of range hoods according to embodiments of the invention depends, at least in some part, on there being liquid in the impingement tray sufficient to filter the incoming effluent stream. In most installations of the range hood, that is not a problem; the hood is simply installed on a flat surface and leveled appropriately, and the hood pressure drop maintains the appropriate amount of liquid in the tray. However, a phenomenon like movement, rocking, or angular displacement can cause a temporary localized reduction in the liquid level in the tray as liquid sloshes to one side or another, potentially allowing at least some effluent to pass the impingement tray without flowing through the liquid. Moreover, in some environments, rocking or angular displacement is unavoidable. For example, cruise ships have become very popular and generally offer full-service industrial kitchens little different from those found in any conventional restaurant. A ship at sea, however, tends to rock back and forth, sometimes by as much as 10 degrees or more, making it possible that enough liquid will be angularly displaced from the impingement tray in the range hood to affect the efficacy of the hood. Other mobile installations tend to create the same sorts of challenges.

Figure 10:
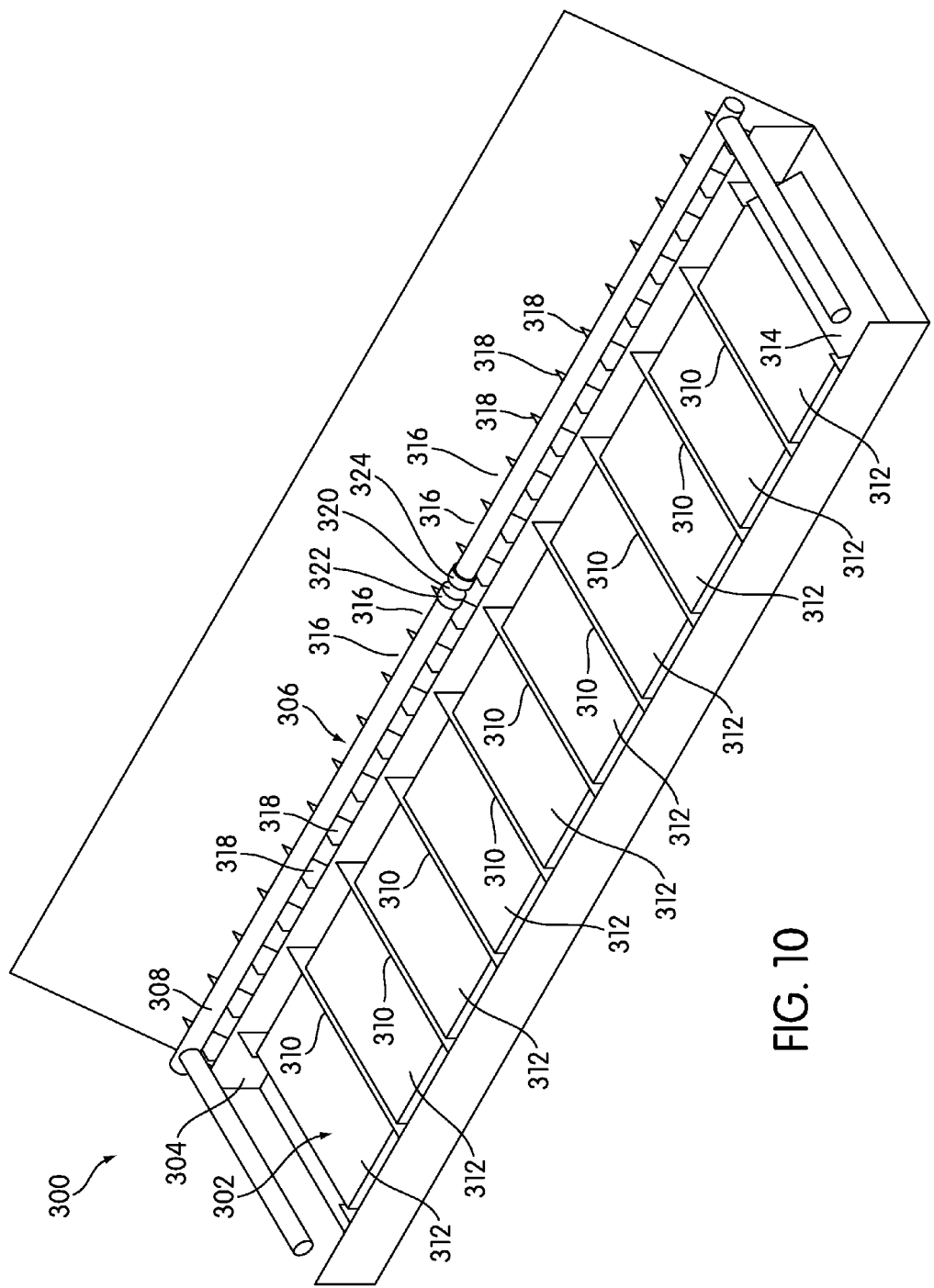
FIG. 10 is a perspective view of an impingement tray and associated structures according to another embodiment of the invention in which the impingement tray is provided with a plurality of baffles.

One solution to the problem of movement, rocking, or angular displacement is shown in FIG. 10, a perspective view of a portion of a range hood, generally indicated at 300. The range hood portion 300 shown in FIG. 10 comprises the same basic elements as in other embodiments: a liquid impingement tray 302 with a right-edge partition 304 that acts as a weir and defines a reservoir space 306, and a fill pipe 308 that directs liquid into the reservoir space 306, from which it overflows onto the impingement tray 302. However, as illustrated, the impingement tray 302 is divided along its length by generally regularly spaced baffles 310. The baffles 310 also extend into the space just adjacent to the impingement tray 302. Thus, the impingement tray 302 is essentially divided into a number of liquid areas or compartments 312 by the baffles 310. Endwall partitions 314 that slope inwardly toward the impingement tray 302 are also provided, one on each end. With this arrangement, if the range hood rocks, moves, or is angularly displaced either along its length or along its width, liquid in the tray 302 may move, but will generally stay within the individual compartments 312, making it more likely that adequate liquid for filtration will remain along the entire length and width of the impingement tray 302.

Although shown as evenly spaced in the illustrated embodiment, the baffles 310 need not be evenly spaced, and the compartments 312 need not be of equal size or volume. In some embodiments, for example, the baffles 310 could be placed closer together toward the respective ends of the impingement tray 302. Generally speaking, the height, extent, spacing, and arrangement of the baffles 310 would be determined, at least in part, based upon the degree of roll, pitch, or other movement that is expected in a particular application or installation.

Some additional adaptations are made to the components that deliver liquid to the impingement tray 302. For example, the reservoir space 306 is subdivided into its own compartments 316 by its own partitions 318 so as to ensure that, to the extent possible, the impingement tray 302 is filled evenly across its entire length despite any rocking or angular displacement that may occur. Additionally, the fill pipe 308 has a U-shape and extends around substantially the entirety of the length and width of the impingement tray 302, so that liquid can be supplied from at least three sides.

The fill pipe 308 also illustrates a feature that may be used in other embodiments as well: it is not continuous. There is a discontinuity 320 in the pipe 308, and the two ends of the pipe are capped by endcaps 322, 324 at the point of discontinuity 320. Such discontinuities or breaks in the pipe 308 may make it easier for the pipe 308 to be removed from the range hood for cleaning or maintenance. Of course, with such a discontinuity, liquid would generally be supplied to the pipe 308 from both ends.

Figure 11:
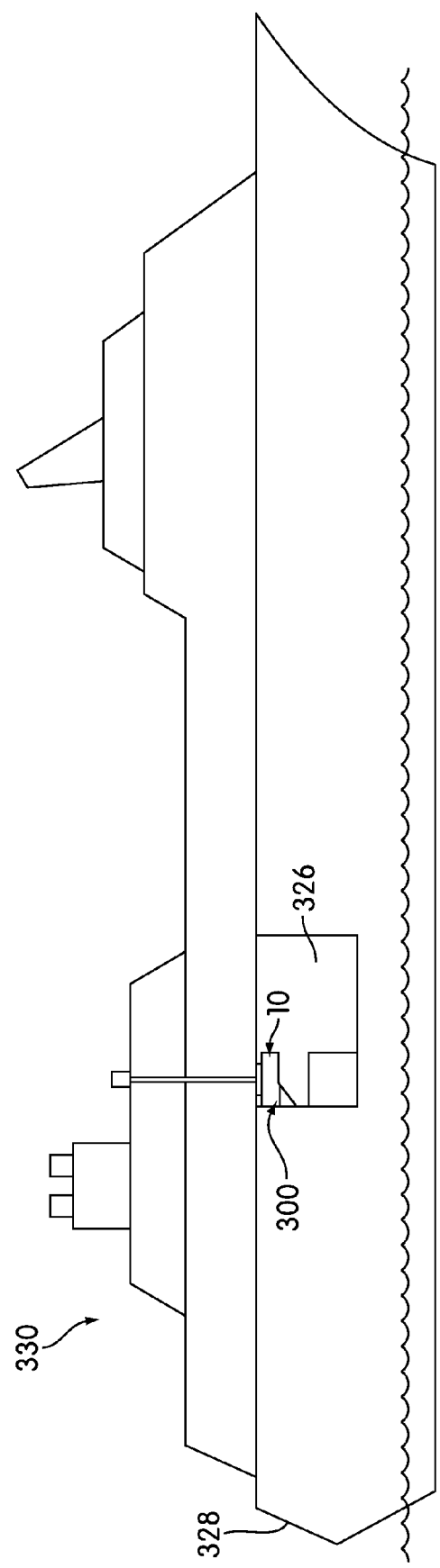
FIG. 11 is a schematic elevational view of a range hood according to an embodiment of the invention installed within a ship hull.

As was described above, these features may be particularly useful in a situation such as that illustrated in the schematic elevational view of FIG. 11, in which a range hood 10 (presumably including the portion 300 shown in FIG. 10) is installed in a galley 326 within the hull 328 of a ship 330. However, the portion 300 shown in FIG. 10 may be incorporated into any embodiment of the invention, whether or not significant movement or angular displacement is expected to occur.

In the embodiments described above, the blowdown process, that is, the process of separating the scum or swarf from the working liquid, is performed entirely within the hood itself. That need not necessarily be the case. In some embodiments, the working liquid may be withdrawn from the hood using the recirculation port 54 and the swarf separated using an external tank or assembly. An external tank or assembly may be used in addition to or instead of the sump skimming mechanisms described above.

FIG. 12 is a perspective view of an external recirculation tank generally indicated at 350, that may be used with some embodiments of the range hood. The recirculation tank 350 of the illustrated embodiment is freestanding and has four legs 352, although that need not be the case in all embodiments. A bottom shelf 354 and enclosure 356 are supported by the legs 352, providing space for housing a pump and other components. Above the enclosure 356 and also supported by the legs 352 is a tank 358. The tank 358 of the illustrated embodiment has two sump compartments 360, 362 that are essentially side-by-side mirror images of one another separated by a barrier 368, although other embodiments may include more or fewer compartments arranged in substantially any manner. The tank also includes a drain compartment 364 at one end of the tank 350 that spans the width of both compartments 360, 362 and is separated from them by a transverse partition 366 that also spans the width of both sump compartments and acts as a weir.

The overall construction and arrangement of the sump compartments 360, 362 and the drain compartment 364 are not dissimilar to the arrangement of the sump 32 within the hood 10. Each compartment 360, 362 has an inlet 370, 372 for contaminated working liquid from the sump 32 of the hood 10, and would typically be in fluid communication with the sump 32 by means of appropriate hoses and valving, which are not shown in the figure. Each compartment 360, 362 also has an inlet for clean or make-up liquid 374, 376 and an outlet 378, 380 that returns liquid to the range hood 10, typically to the inlet pipe 34 for the impingement tray.

Contaminated liquid from the sump 32 of the range hood 10 can be selectively pumped into either compartment 360, 362 of the recirculation tank 350. One advantage of having two compartments 360, 362 is that the two compartments can be used separately and in parallel. Liquid may be pumped into one compartment 360 and allowed to settle for a few minutes so that contaminants separate from the liquid while liquid in the other compartment 362 is pumped back to the hood 10, cleaned, or used in some other manner. Many such arrangements are possible.

When it is desirable or necessary to remove scum or swarf from the surface of the liquid in one of the compartments 360, 362, that would be done by adding clean liquid to the compartment 360, 362 in question, causing the compartment 360, 362 to overflow the partition 366 and land in the drain compartment 358, whose drain port 382 would typically be connected to a sanitary sewer.

As was noted above, the range hood 10 may be used with or without the recirculation tank 350. If it is used with the recirculation tank 350, several different configurations are possible. First, in some embodiments, the sump may not include a drain compartment 50; instead, the sump may simply comprise a single compartment, and all skimming and sump blowdown operations may be handled by the recirculation tank 350.

In other embodiments, the sump may be arranged as described above with a drain compartment, and the recirculation tank 350 may be used for additional purification of the working liquid withdrawn from the recirculation port 54 of the sump 32. If the recirculation tank 350 is used, one or more compartments 360, 362 may be used in parallel. Thus, in the illustrated embodiments, one, two, or three sump compartments may be used in serial and/or parallel to purify the working liquid of the range hood 10. In other embodiments, any number of sump compartments could be used.

In many applications and embodiments, a single sump 32 contained within the range hood 10 will be adequate and the most convenient way to handle the volume of scum or swarf that is produced by filtration of the effluent stream. However, for certain applications, for example, where high-fat products are flame-broiled over an open flame, in high-temperature wok cooking, and in other applications in which the effluent stream is likely to contain a large amount of oils or fats, the use of a recirculation tank 350 with one or more compartments in addition to the internal sump 32 may be advantageous. One particular advantage of the use of a recirculation tank 350 is that it may further reduce the amount of fresh liquid needed for a blowdown cycle, and may also reduce the overall liquid usage of the hood.

In the foregoing description, many different embodiments of range hoods according to the invention have been described. However, it should be understood that unless two sets of features are clearly mutually exclusive alternatives to one another (e.g., the configuration of the sump 32, 102), those features may be used together in any combination. Thus, one embodiment of a range hood might include a horizontally-extending flange 206, flow-distributing louvers 252 over its inlet, and a recirculation tank 350.

Range hoods according to embodiments of the invention would typically be made of a metal, such as stainless steel, using any conventional fabrication process. Some portions may be formed from continuous sheets of metal; other portions may be heat-joined (e.g., by welding or brazing) or joined by fasteners. The material may be painted or surface treated, if desired, so as to resist environmental conditions and chemical attack. Generally speaking, the fabrication process or processes that are used would be selected so as to produce the highest quality finished piece while minimizing the cost.

Figure 13:
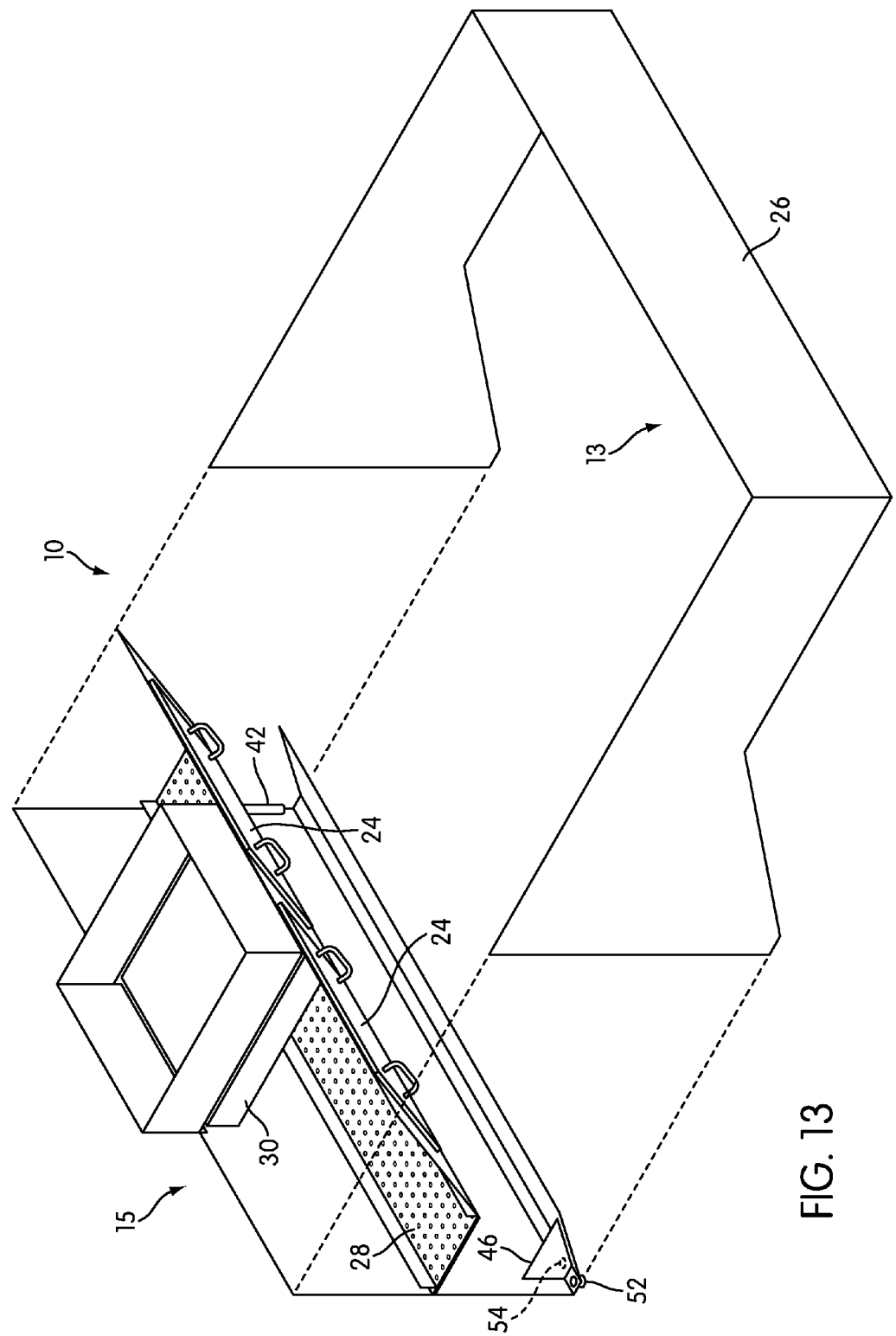
FIG. 13 is an exploded perspective view of the range hood of FIG. 1, illustrating the set of components that may be provided as an upgrade unit to retrofit existing range hoods.

FIG. 13, an exploded perspective view of the range hood 10 of FIG. 1, illustrating one example of how the range hood 10 might be constructed. As shown in the figure, a portion of the hood body, generally indicated at 13, which includes its forward flange 26, is made separately from most of the internal components of the hood 10, which are generally indicated at 15.

FIG. 13 also illustrates another aspect of the invention. In many cases, a restaurant will already have a range hood, and removing and replacing that hood represents a serious cost. In that case, the internal components of the hood 15 may be sold without the hood body 12, or portions of the hood body 12, so that existing range hoods can be retrofit to include the features of range hoods 10 according to embodiments of the present invention. The retrofit range hood would generally use the blower and hood body of the existing hood.

Hood Operation

There are two main aspects in controlling the operation of range hoods according to embodiments of the invention: control of the flow of the working liquid that is used to filter and purify the effluent stream, and control over the fan or blower 20 that draws the effluent stream through the range hood. Those of skill in the art will be familiar with many methods by which those two aspects can be controlled, and any of those methods may be used; however, for the sake of completeness, certain particular methods and considerations will be described here.

Several methods may be used to control the flow of working liquid. The simplest embodiments of the invention may employ manual control over the flow of working liquid. For example, a user may manually open valves to fill the sump and the impingement tray, and may periodically reopen those valves to add clean replacement liquid to the sump and impingement tray and to initiate the blowdown cycles described above. Similarly, another set of valves could be opened to withdraw liquid from the sump through its recirculation port for recirculation or for disposal.

However, a degree of automatic control over the operation of the range hood is helpful in most embodiments. In automatic control embodiments, the range hood would be fitted with one or more sensors that act to detect its state, and certain processes may be initiated automatically, either as a result of a condition detected by one of the sensors, or as part of an automatically timed sequence. A central unit with some computing or directing capability may initiate the various processes within the hood. As used in this description, the term "central unit" may be construed to include any computer, controller, or automated system with the capability to execute the functions described. Exemplary central units may include general purpose computers, application-specific integrated circuits, microprocessors, programmable logic controllers, and the like, along with their associated components. The central unit may or may not be housed in an enclosure separate from the range hood itself, and may or may not include other components as well, depending on the embodiment. The valves that control liquid flow to and within the range hood may be solenoid valves or other electronically controllable valves, so as to be responsive to commands from the central unit.

For example, the sump 32 may be outfitted with an electronic water level sensor or sensors. In that case, when the range hood is activated, the central unit would open the solenoid valve that controls flow into the sump liquid inlet 44, and the valve would remain open, allowing liquid to flow into the sump 32, until the electronic level sensor or sensors indicate that the liquid level within the sump 32 has reached a "high" level appropriate for operation. Alternatively or additionally, the central unit may be associated with a smaller indicator reservoir that has a volume proportional to the volume of the sump 32 and fills at a rate proportional to that of the sump 32, such that the central unit, in determining whether there is liquid in the sump 32 can check either or both of the level sensor associated with the sump and the level sensor associated with the indicator reservoir. The inlet 34 responsible for filling the impingement tray 28 would also be opened, typically for some predetermined amount of time based on flow rate, to fill the impingement tray 28. While the hood is in operation, if the level sensor in the sump detects that the liquid level is low, the clean liquid inlet would be opened to refill the sump to the "high" level.

Once the range hood is in operation, the blowdown cycles described above for skimming the impingement tray 28 and the sump 32 would be performed periodically. These processes may be performed at particular timed intervals, depending on the application and state of the hood. For example, blowdown cycles may be initiated every two hours, every hour, or every half-hour. Generally, the blowdown process would be initiated more frequently in situations in which the effluent is expected to contain more contaminants, such as oils and fats. In some embodiments, the frequency of the blowdown process may also be linked to the speed of the fan or blower, such that if the fan or blower is turned up, indicating a larger effluent stream, the blowdown frequency increases.

When a blowdown process is initiated, it may be controlled by the central unit using an automatic timed sequence. Since the flow rates of liquid into the various inlets would typically be known, the solenoid valves could be opened for periods of time sufficient to admit the amount of liquid necessary to skim the impingement tray and sump.

With respect to the fan or blower, the range hood and blower would typically be designed to move air through the range hood at a constant rate. That rate may be determined, in whole or in part, by regulatory guidelines, by the type of installation or application, or by other factors. As one example, the range hood and blower may be designed for an air movement rate of 550 CFM per linear foot of hood length.

However, in most embodiments, it is helpful to provide the user with some ability to modify the speed of the fan or blower, sometimes called a "turndown capacity." For example, a user might be permitted to reduce the speed of the blower 20% and to increase the speed of the blower 20% relative to the typical fixed speed. Thus, if the range hood is not being used heavily during a period of the day, the blower can be turned down, and if the range hood is being heavily used (e.g., during a lunch or dinner rush), the speed of the blower can be increased. Note that the blower speed controls need not be continuously variable, although they certainly may be in some embodiments. In most typical embodiments, it is sufficient to provide the user with a blower speed selector switch capable of switching between several predetermined blower speeds. Those blower speeds may be coupled to other behaviors of the range hood; as was noted above, blowdown frequency may be increased with increasing blower speed.

As was described above with respect to FIG. 2, filters 22 may be installed between the range hood 10 and the blower 20 to catch any odors, fine particles, or other matter that might not be removed by the range hood 10 itself. For example, the filters may be carbon or activated charcoal filters that are adapted to catch contaminants that are not filtered by passage through liquid. However, as those of skill in the art understand, as filters become clogged with foreign matter, flow rates can decrease. In some embodiments, the speed of the blower 20 may be controlled in accordance with a flow or pressure sensor located between the filters 22 and the blower 20 to maintain a given pressure drop or airflow notwithstanding the flow restriction posed by the filters 22.

While the invention has been described with respect to certain embodiments, those of skill in the art will appreciate that the embodiments are intended to be exemplary, rather than limiting. Modifications and changes may be made within the scope of the invention, which is described by the appended claims.

What is claimed is:

1. A range hood, comprising:
    an inlet and an outlet, the inlet being adapted to accept a contaminated effluent stream and the outlet being adapted to be connected directly or indirectly to a blower such that in an operational condition of the range hood, a pressure drop is maintained across the range hood from inlet to outlet, thus drawing the effluent stream from the inlet toward the outlet, the inlet and the outlet being arranged relative to one another such that a substantially straight airflow path is provided for the effluent stream from a point just inside the inlet to the outlet;
    a substantially horizontally-extending liquid support provided in the airflow path, the liquid support being constructed and arranged to support liquid and having a plurality of perforations such that, in the operational condition, liquid is supported on and retained by the liquid support at least in part by the pressure drop across the range hood, the liquid support being provided in the airflow path such that, in the operational condition, the contaminated effluent stream flows through the liquid support and any liquid supported thereon as it flows along the airflow path; and
    a sump constructed and adapted to hold liquid, the sump being arranged relative to the liquid support such that liquid from the liquid support can drain into the sump.

2. The range hood of claim 1, further comprising a mist eliminator arranged in the airflow path between the liquid support and the outlet.

3. The range hood of claim 2, further comprising a liquid support supply and skimming system, the liquid support supply and skimming system being constructed and arranged to skim the liquid supported on the liquid support and including:
    an upper liquid inlet in fluid communication with a liquid source;
    a reservoir space adjacent to the liquid support, the reservoir space being constructed and arranged to accept and contain liquid from the liquid inlet; and
    a first partition between the reservoir space and the liquid support, the first partition being arranged such that when the reservoir space is filled to overflow, liquid from the reservoir space moves over the first partition and across the liquid support, thereby skimming the liquid supported on the liquid support.

4. The range hood of claim 3, further comprising:
    a first drain space adjacent to the liquid support;
    a drain conduit in fluid communication with the first drain space and the sump, thereby placing the first drain space in fluid communication with the sump; and
    a second partition between the liquid support and the first drain space.

5. The range hood of claim 4, wherein the sump further comprises:
    a third partition defining and separating a main sump compartment and a second drain space;
    a first drain port in the drain space; and
    a second drain port in the main sump compartment;
    wherein the first and second drain ports are constructed and arranged to drain the drain space and the main sump compartment, respectively.

6. The range hood of claim 5, wherein the drain conduit is in fluid communication with the main sump compartment.

7. The range hood of claim 5, wherein the sump further comprises a bottom, the first and second drain ports being located in the sump bottom, the sump bottom being sloped or contoured so as to bias contents of the sump to move toward the first and second drain ports.

8. The range hood of claim 5, wherein the main sump compartment further comprises a lower liquid inlet.

9. The range hood of claim 8, wherein the main sump compartment and second drain space are arranged relative to one another such that when the level of liquid in the main sump compartment is raised to a level higher than the height of the third partition, liquid in the main sump compartment overflows into the second drain space.

10. The range hood of claim 9, wherein the third partition is a transverse partition located proximate to one end of the sump, such that the second drain space is proximate to one end of the sump.

11. The range hood of claim 9, wherein the third partition is a longitudinal partition, such that the second drain space is proximate to the front or rear of the sump.

12. The range hood of claim 8, further comprising a liquid recirculation system connected between the second drain port in the main sump compartment and the upper liquid inlet, the liquid recirculation system being constructed and adapted to recirculate liquid from the second drain port to the upper liquid inlet.

13. The range hood of claim 12, wherein the liquid recirculation system comprises:
a recirculation tank constructed and arranged to receive the liquid from the second drain port, the recirculation tank including
at least one liquid compartment,
a recirculation inlet constructed and adapted to place the at least one liquid compartment in fluid communication with the second drain port,
a tank clean liquid inlet adapted to be connected to a clean liquid source,
a recirculation outlet constructed and adapted to place the at least one liquid compartment in fluid communication with the upper liquid inlet,
a fourth partition defining and separating the at least one liquid compartment with a tank drain compartment, and
a tank drain port constructed and arranged to drain the tank drain compartment; and
a pump constructed and adapted to move the liquid from the second drain port into the recirculation tank and from the recirculation tank to the upper liquid inlet.

14. The range hood of claim 13, wherein the recirculation tank comprises two identical or mirror-image liquid compartments and a valve system constructed and arranged such that the liquid can be selectively provided to one or the other of the two liquid compartments.

15. The range hood of claim 13, wherein the liquid recirculation system comprises a surfactant supply system.

16. The range hood of claim 1, further comprising:
a hood body enclosing the range hood; and
one or more access doors in the hood body, the access doors being constructed and arranged such that the components of the range hood can be accessed through the access doors.

17. The range hood of claim 1, wherein the liquid support further comprises a number of baffles attached to the liquid support and extending upwardly therefrom, the baffles being arranged so as to divide and enclose a plurality of individual liquid areas along the liquid support, the height and arrangement of the baffles being such that liquid will be retained in the individual areas of the liquid support upon movement of the range hood.

18. The range hood of claim 1, wherein the liquid is water.

19. A range hood, comprising:
an inlet and an outlet, the inlet being adapted to accept a contaminated effluent stream and the outlet being adapted to be connected directly or indirectly to a blower such that in an operational condition of the range hood, a pressure drop is maintained across the range hood from inlet to outlet, thus drawing the effluent stream from the inlet toward the outlet, the inlet and the outlet being arranged relative to one another such that a substantially straight airflow path is provided for the effluent stream from a point just inside the inlet to the outlet;
a substantially horizontally-extending liquid support provided in the airflow path, the liquid support being constructed and arranged to support liquid and having a plurality of perforations such that, in the operational condition, liquid is supported on and retained by the liquid support at least in part by the pressure drop across the range hood, the liquid support being provided in the airflow path such that, in the operational condition, the contaminated effluent stream flows through the liquid support and any liquid supported thereon as it flows along the airflow path;
a mist eliminator arranged in the airflow path between the liquid support and the outlet;
a sump constructed and adapted to hold liquid, the sump being arranged relative to the liquid support such that liquid from the liquid support can drain into the sump, the sump including
a main sump compartment,
a sump drain compartment constructed and adapted to be connected to a drain, and
a partition separating the main sump compartment and the sump drain compartment,
the arrangement of the main sump compartment and the sump drain compartment being such that contaminants can be removed from the sump by selectively overflowing the sump into the sump drain compartment.

20. A ship, comprising:
a ship hull;
one or more effluent-generating appliances installed within the ship hull; and
a range hood installed within the hull in operational association with the one or more cooking appliances, the range hood including
an inlet and an outlet, the inlet being adapted to accept a contaminated effluent stream and the outlet being adapted to be connected directly or indirectly to a blower such that in an operational condition of the range hood, a pressure drop is maintained across the range hood from inlet to outlet, thus drawing the effluent stream from the inlet toward the outlet, the inlet and the outlet being arranged relative to one another such that a substantially straight airflow path is provided for the effluent stream from a point just inside the inlet to the outlet,
a substantially horizontally-extending liquid support provided in the airflow path, the liquid support being constructed and arranged to support liquid and having a plurality of perforations such that, in the operational condition, liquid is supported on and retained by the liquid support at least in part by the pressure drop across the range hood, the liquid support being provided in the airflow path such that, in the operational condition, the contaminated effluent stream flows through the liquid support and any liquid supported thereon as it flows along the airflow path, the liquid support also including a number of baffles attached to the liquid support and extending upwardly therefrom, the baffles being arranged so as to divide and enclose a plurality of individual liquid areas along the liquid support, the height and arrangement of the baffles being such that liquid will be retained in the individual areas of the liquid support despite movement of the ship; and
a sump constructed and adapted to hold liquid, the sump being arranged relative to the liquid support such that liquid from the liquid support can drain into the sump.

* * * * *